Patented Aug. 18, 1953

2,649,419

UNITED STATES PATENT OFFICE 2,649,419

MOLYBDENUM DISULFIDE CONTAINING HYDROGENATION CATALYST

Herbert L. Johnson and Archibald P. Stuart, Media, Pa., assignors to Sun Oil Company, Philadelphia, Pa., a corporation of New Jersey No Drawing. Application November 16, 1950, Serial No. 196,092

2 Claims. (Cl. 252—439)

This invention relates to the hydrogenation of carbonaceous materials. More particularly, the invention relates to a novel catalyst especially suitable in processes for the hydrogenation of hydrocarbon oils.

The catalyst of the present invention consists of molybdenum disulfide, iron sulfide, silica, titania, and alumina. In order to obtain the advantages of the present invention, it is essential that the quantity of each component of the catalyst be within a relatively narrow range, as hereinafter defined.

Molybdenum disulfide has been described as an effective hydrogenation catalyst when used alone, such as in pellet or lump form, and also when used admixed with other materials, such as alumina. The use of carriers with molybdenum sulfides has also been described. The use of such heretofore described catalysts, however, has certain disadvantages, such as lack of mechanical strength in the absence of a carrier, and failure of the catalyst to cause sufficient hydrogenation of aromatic hydrocarbons without resort to relatively drastic conditions under which deleterious reactions, such as cracking, are observed.

An object of the present invention is to provide a catalyst especially suitable for the hydrogenation of hydrocarbon oils. Another object is to provide a process for the hydrogenation of unsaturated hydrocarbons. A further object is to provide a process for the hydrogenation of the aromatic constituents of petroleum fractions. Other objects appear hereinafter.

It has now been found that a catalytic composition consisting of molybdenum disulfide, iron sulfide, silica, titania, and alumina is highly effective for the hydrogenation of hydrocarbon oils, and especially the aromatic constituents of hydrocarbon oils derived from petroleum. In accordance with the present invention, the catalyst consists of from 10% to 25% molybdenum disulfide, from 9% to 30%, and preferably from 9% to 15% iron sulfide (calculated as ferric oxide), from 4% to 9% silica, from 1% to 4% titania, and from 40% to 75% alumina. A small amount of volatile material, principally water, should be present, from 3% to 6%. As will be shown, it is essential that the catalytic composition be maintained within the defined ranges in order to achieve the advantages of the present invention.

The present catalyst may be prepared by convenient means, it being essential that the components be present within the defined ranges. For example, a gel consisting of the hydroxides of iron, silicon, titanium, and aluminum may be prepared by precipitation from an aqueous solution of their soluble salts, such as the water soluble nitrates, sulfates, carbonates, acetates, and the like. Silica may advantageously be supplied by using a water soluble alkali metal silicate, such as sodium or potassium silicate. It is advantageous to precipitate the hydroxides from a mixture of soluble salts wherein the concentration of each component is such that the quantity thereof in the final product is within its defined range. The so-formed gel is then heated to convert the hydroxides to the oxides, and molybdenum disulfide deposited thereon, such as by impregnation with an aqueous solution of ammonium molybdate, treatment with hydrogen sulfide, and heating in an atmosphere of hydrogen. In this treatment, the iron oxide is substantially converted to iron sulfide, but in the final composition metallic iron and iron oxide may be present, and cause no deleterious results. Accordingly, reference to "iron" or an "iron compound," as used herein in connection with the iron component of the present catalyst, is intended to include iron and the iron compounds which may be present in the composition. It is also possible to precipitate the molybdenum from an aqueous solution of its water soluble salts, together with the above-mentioned hydroxides, and convert it to the sulfide, as above described.

A particularly advantageous method of preparing the present catalyst is to deposit molybdenum disulfide on a mineral composition containing silica, titania, alumina, and an iron compound, such as iron oxide, in quantities so that the concentration of constituents in the final catalyst is within the present ranges. The deposition should be accomplished by a process wherein the iron compound is converted to iron sulfide. Where necessary, the concentration of one or more components of such a mineral may be adjusted to within the appropriate range, such as by impregnation, to increase the quantity, or by leaching with one or more materials, such as hydrofluoric, hydrochloric, nitric, or other mineral acid, to reduce the quantity, or by blending to increase or decrease the relative quantity of one or more components. Deposition of molybdenum disulfide on such a mineral may be as above-described for the synthetic composition.

The catalysts of the present invention are especially suitable for the hydrogenation of the aromatic constituents of petroleum fractions. For example, the properties of lubricating oil may be improved by hydrogenating in accordance with the present invention. It is especially advantageous to hydrogenate one-pass gas oil to improve the crackability thereof. For example, hydrogenation of a one-pass gas oil having a boiling point of from about 400° F. to 700° F. and containing from 30% to 50% aromatic hydrocarbons, principally polynuclear aromatics such as naphthalenes, to convert a portion thereof to tetralins and decalins, and subsequent cracking results in an increase in the gasoline yield and a decrease in coke formation. Other unsaturated hydrocarbons, such as olefins and acetylenes, and hydrocarbon mixtures containing such unsaturated hydrocarbons, may advantageously be hydrogenated in the presence of the present catalyst.

The catalysts of the present invention are effective for the hydrogenation of aromatic hydrocarbons, such as naphthalenes, under relatively mild conditions, the optimum conditions for a given application being dependent upon the charge stock, the degree of hydrogenation desired, and the like. In general, using the present catalysts, hydrogenation is advantageously obtained by using a pressure of from 500 to 1,800 p. s. i. and a temperature of from 250° C. to 350° C. Higher temperatures and pressures can be used, so long as the variables are maintained within hydrogenation conditions.

In order to demonstrate the effectiveness of the catalyst and process of the present invention, a mineral composition containing iron oxide, titania, silica, alumina, and a small quantity of volatile material, including water, was impregnated with an aqueous solution of ammonium molybdate. Water was expelled by gentle heating and the resulting mass treated with hydrogen sulfide to convert the ammonium compound to ammonium thiomolybdate and the iron to iron sulfide. The composition was then heated to 300° C. in an atmosphere of hydrogen to convert the thiomolybdate to the disulfide.

The so-prepared catalyst had a final composition, in parts by weight, as follows: molybdenum disulfide=21.0; iron sulfide=10.7; (calculated as ferric oxide); silica=6.1; titania=2.4; alumina=55.5; volatile material, principally water, about 4.3. In the following table, this catalyst of the present invention is designated as "A."

For purposes of comparison, another catalyst was prepared in an identical manner except that a substantial proportion of the iron was removed from the mineral composition before deposition of the molybdenum sulfide. This catalyst had a final composition, in parts by weight, as follows: molybdenum disulfide=21.0; iron sulfide=0.4 (calculated as ferric oxide); silica=4.9; titania=1.1; alumina=67.5; and an amount of volatile material, principally water 5.1. The concentration of all components of this catalyst come within the claimed ranges with the exception of the iron compounds. In the following table, this catalyst is designated as "B."

Additional catalysts were prepared identical to "B," except that the amount of molybdenum disulfide was decreased to 10.7 and 5.35 parts by weight; these catalysts are designated in the table as 'C" and "D," respectively.

Also for purposes of comparison, a commercially available catalyst consisting of molydenum trisulfide on alumina was tested, and is identified in the table as "E"; molybdenum sulfide was deposited on essentially pure alumina to form a composition containing 21.4% molybdenum disulfide, designated as "F" in the table; molybdenum sulfide was deposited on active carbon to form a composition designated as "G" in the table.

All of the above-described catalysts were used, at various temperatures and pressures, for hydrogenating one-pass catalytic gas oil containing 31.1% aromatic hydrocarbons and having a refractive index $n_D^{20}$=1.4942. In saturating aromatic bonds, e. g. in hydrogenating naphthalene to decalin, the refractive index of the hydrocarbon mixture is decreased and thus the decrease in refractive index constitutes a measure of the degree of hydrogenation. In the table, the figures given refer to the difference ($n_D^{20}$) in refractive index before and after hydrogenation X10⁴. In each run, the space rate (liquid hourly space velocity) was 1, and usually will be within the range of from 0.25 to 5.0.

| Catalyst | Change in Refractive Index ($n_D^{20}$) Times 10⁴ | | | | | | |
|---|---|---|---|---|---|---|---|
| | A | B | C | D | E | F | G |
| $T$=300° C.<br>$P$=1,000 p. s. i. | 110 | 92 | 54 | 88 | 73 | 70 | 106 |
| $T$=300° C.<br>$P$=1,500 p. s. i. | 128 | 110 | 57 | 90 | 84 | 83 | 116 |
| $T$=340° C.<br>$P$=1,000 p. s. i. | 163 | | 110 | 145 | 110 | 120 | 147 |
| $T$=340° C.<br>$P$=1,500 p. s. i. | 202 | 183 | 131 | 160 | 123 | 150 | 172 |

The data of the table show that the catalyst of the present invention is superior to other catalysts heretofore described for use in hydrogenation processes, and that compositions similar to the present catalytic compositions, but in which the concentration one or more of the constituents is outside of the claimed range, gives inferior results.

The invention claimed is:

1. An improved hydrogenation catalyst containing from 10% to 25% by weight molybdenum disulfide, from 9% to 30% by weight iron (calculated as ferric oxide), from 4% to 9% by weight silica, from 1% to 4% by weight of titania, and from 40% to 75% by weight of alumina.

2. An improved hydrogenation catalyst consisting essentially of about 21% by weight of molybdenum disulfide, about 10.7% by weight of iron (calculated as ferric oxide), about 6.1% by weight of silica, about 2.4% by weight of titania, about 55.5% by weight of alumina, and about 4.3% by weight of water.

HERBERT L. JOHNSON.
ARCHIBALD P. STUART.

UNITED STATES PATENTS

References Cited in the file of this patent

| Number | Name | Date |
|---|---|---|
| 2,334,872 | Free et al. | Nov. 23, 1943 |
| 2,355,388 | Michael et al. | Aug. 8, 1944 |